United States Patent
Muehlhauser et al.

[11] Patent Number: 6,070,475
[45] Date of Patent: Jun. 6, 2000

[54] AIR DATA PROBE WITH HEATER MEANS WITHIN WALL

[75] Inventors: Brett A. Muehlhauser, Prior Lake; Brian Ranum, Spring Lake, both of Minn.

[73] Assignee: Rosemont Aerospace Inc., Burnsville, Minn.

[21] Appl. No.: 08/950,823

[22] Filed: Oct. 15, 1997

[51] Int. Cl.[7] ..................................................... G01F 1/46
[52] U.S. Cl. .......................................................... 73/861.68
[58] Field of Search ................................ 73/182, 861.65, 73/861.68; 374/141, 142, 143

[56] References Cited

U.S. PATENT DOCUMENTS

| | | | |
|---|---|---|---|
| 3,482,445 | 12/1969 | DeLeo et al. | 73/182 |
| 3,514,999 | 6/1970 | Mejean et al. | 73/212 |
| 4,121,088 | 10/1978 | Doremus et al. | 219/201 |
| 4,730,487 | 3/1988 | DeLeo et al. | 73/182 |
| 5,043,558 | 8/1991 | Byles | 73/861.68 |
| 5,302,026 | 4/1994 | Phillips | 374/135 |
| 5,319,970 | 6/1994 | Peterson et al. | 73/182 |
| 5,369,993 | 12/1994 | Hagen | 73/178 |
| 5,466,067 | 11/1995 | Hagen et al. | 374/138 |

FOREIGN PATENT DOCUMENTS

| | | |
|---|---|---|
| 1118794 | 7/1968 | United Kingdom . |
| 8203693 | 10/1982 | WIPO . |

Primary Examiner—William Oen
Attorney, Agent, or Firm—James M. Rashid

[57] ABSTRACT

An air data probe (10) such as a pitot probe, pitot-static probe, or total air temperature probe incorporates heaters (42) within the wall (30) of the device. The heater (42) extends from the base (12) of the probe (10) to the tip (18) of the probe (10). In a preferred embodiment, the heater (42) is a wire heater that extends in the wall (30) of the probe (10) from the base (12) to the tip (18), and surrounds a sampling chamber (24) in the probe (10) in a spiral pattern.

19 Claims, 2 Drawing Sheets

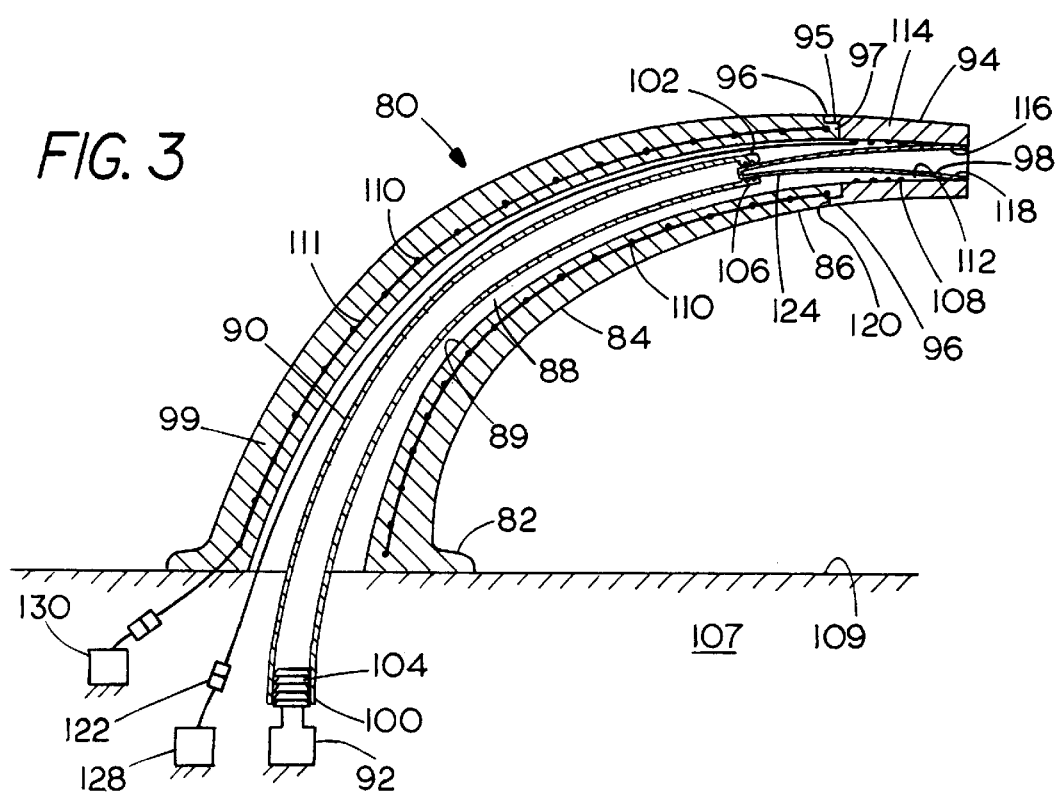

AIR DATA PROBE WITH HEATER MEANS WITHIN WALL

TECHNICAL FIELD

This invention relates to air data probes. In particular, this invention relates to air data probes that are easier to manufacture and have improved means for providing heat to the probe.

BACKGROUND ART

Air data probes are well known within the aerospace industry for providing information concerning the aircraft's airspeed, Mach number, and flight direction. Pitot, pitot-static, and total air temperature air data probes are exemplary, and are shown in, for example, U.S. Pat. Nos. 5,466,067 to Hagen, et al.; 5,369,993 to Hagen; 5,319,972 to Peterson, et al.; and 5,302,026 to Phillips. Air data probes are also used in industries outside of the aerospace industry, for example in weather stations and other applications where data concerning the air or atmospheric conditions are desired.

As shown in the above referenced patents, the shape of pitot and pitot-static probes include, and range from, an "L" shaped probe to a continuously swept probe. Aerodynamically compensated air data probes are shown in U.S. Pat. No. 4,730,487 to De Leo et al. The aforementioned Phillips patent shows the shape of a total air temperature probe. Other shapes are known in the industry.

Because of the environmental conditions that aircraft typically fly in, ice is known to form on the air data probes described above. When ice does form on the probe, the ability of the probe to measure air parameters deteriorates, and in some cases, the probe becomes entirely inoperable. It is therefore necessary to incorporate into the probe means to prevent the formation of ice, or to melt ice once it has formed. U.S. Pat. No. 4,730,487 to De Leo, et al. and U.S. Pat. No. 5,043,558 to Byles are illustrative of heaters used to address the formation of ice on air data probes.

One problem associated with prior art heaters shown in the aforementioned patents is that they are labor intensive to install and therefore costly to manufacture, and they are difficult to inspect. Further, if inspection indicates that the heater is not fabricated or joined to the probe in a satisfactory manner, it is difficult to perform repair operations; as a result, probes that do not meet manufacturing requirements are often scrapped.

Additionally, it is known that the prior art heaters consume relatively large amount of power from the aircraft, which is undesirable from the aircraft's point of view. This is especially the case in the construction shown in the '487 patent. In this construction, the probe includes a tubular barrel portion, and heater wires are brazed to the internal surface of the probe barrel. If ice forms on the external surface of the barrel during operation of the probe, heat must be conducted through the wall of the barrel in order to melt the ice. Because the surface of the heater wire only contacts the internal barrel surface along a tangent line, much of the heat generated by the wire never reaches the barrel wall, and is lost.

Accordingly, improvements are sought in the manufacture of air data probes, and in particular, in the construction and arrangement of heaters for preventing ice formation on air data probes.

SUMMARY OF THE INVENTION

According to the present invention, an improved air data probe comprises a base for attachment to a structure, a tip for extending into an airstream, and a body having an outer surface and extending from the base to the tip, wherein the body has a sampling chamber therewithin and the outer boundary of the sampling chamber is defined by a chamber outer surface, and wherein the chamber outer surface and the body outer surface define a wall therebetween extending from the base to the tip and having a uniform composition, cast metal microstructure, and the probe further comprises means for heating the probe that are disposed in the wall and surround the chamber, and extend in the wall from the base to the tip.

In a preferred embodiment of the invention, the heating means is a wire heater which extends in the wall in a spiral pattern around the sampling chamber from the base of the probe to the tip. In the most preferred embodiment, the probe further comprises a conduit disposed within or defining the sampling chamber, and wherein the conduit is in fluid communication with an opening in the probe tip and with an air data transducer means.

Other features and advantages of the present invention will be appreciated by reference to the following drawings and description of the invention.

BRIEF DESCRIPTION OF THE DRAWINGS

FIG. 3 is a cross-sectional view of an embodiment of the invention.

FIG. 4 is a cross-sectional view of an embodiment of this invention.

BEST MODE FOR CARRYING OUT THE INVENTION

Figure 1:
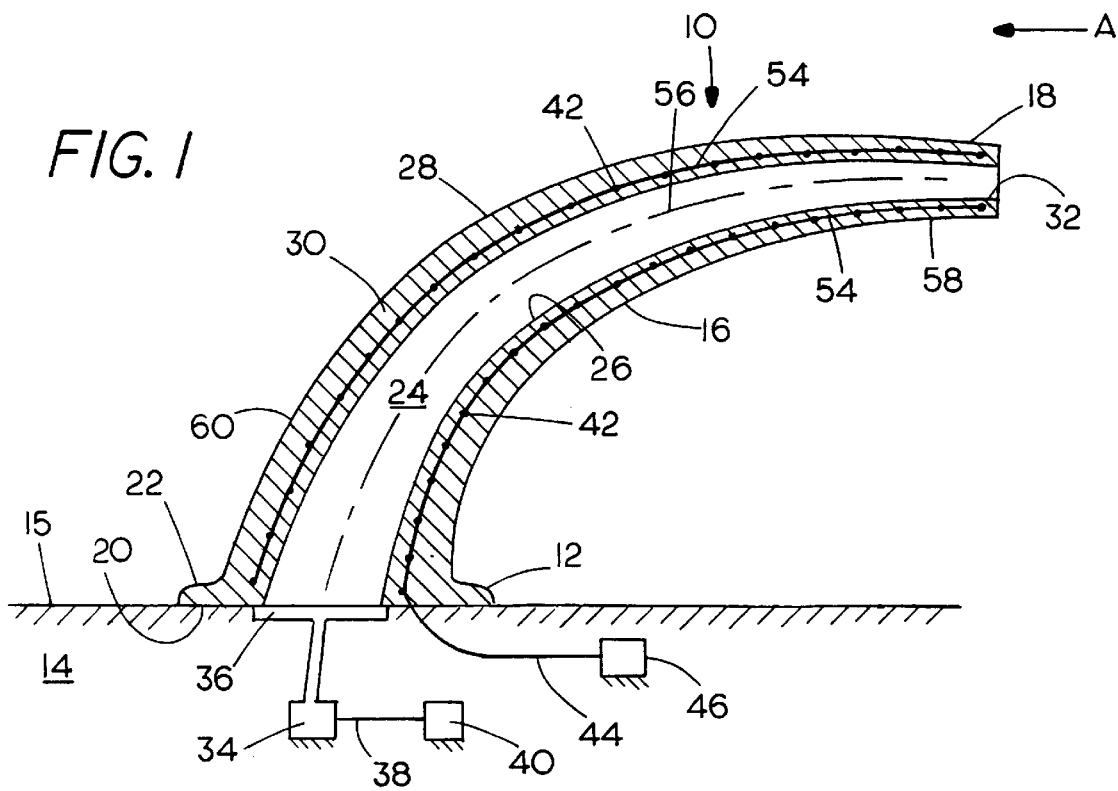
FIG. 1 is a cross-sectional view of a probe in accordance with the present invention, partly broken away.

The invention is best understood by reference to FIG. 1 which shows an air data probe 10 having a base 12 for attachment to a structure 14, which is typically an aircraft or other air vehicle, or any other device used in conjunction with measuring or monitoring atmospheric conditions, such as a weather station. A probe body 16 extends from the base 12 to the tip 18 of the probe 10. The probe tip 18 projects into an airstream which generally flows in the direction of the arrow A. The base 12 of the probe 10 is generally in the shape of a flange or shoulder having inner 20 and outer 22 surfaces, respectively. The probe 10 is attached to the surface 15 of air vehicle 14 by bolts or the like (not shown) which pass through or extend from the base 12 into the air vehicle 14.

Extending within the probe body 16 is a sampling chamber 24 whose outer boundary is defined by a chamber outer surface 26. The chamber outer surface 26 and the outer surface 28 of the probe 10 define a solid wall 30 therebetween. The wall 30 has a uniform composition, cast metal microstructure that is formed by a casting process described in more detail below. The term "metal" is used in the conventional sense, and includes pure metallic elements such as nickel or aluminum; metal alloys such as beryllium-copper or any of the Inconel® alloys; and metal matrix composites such as nickel-boron carbide or copper-aluminum carbide. Non metallic composites may also be used in some applications. Casting processes include investment casting techniques, lost foam techniques, and other similar techniques known to those skilled in the art. Preferably, the composition of the wall 30 is a metal having high thermal conductivity. Examples include aluminum alloys, copper alloys, and alloys of nickel; high conductivity metal matrix composite materials may also be used. Additionally, the surface of the probe may be coated or otherwise treated in order to enhance its properties. For example, corrosion or erosion resistance may be improved by the application of any of the coating and surface treatments known to those skilled in the art.

An opening 32 extends through the tip 18 of the probe 10 into the air data sampling chamber 24. In this fashion, the tip 18 and the sampling chamber 24 are in fluid communication with each other. Similarly, the sampling chamber 24 is in fluid communication with a transducer 34 capable of making appropriate parametric measurements of the air that flows into the sampling chamber. If the probe 10 is used on an aircraft, the transducer 34 is typically connected via suitable fittings 36 along a line 38 to an air data computer 40 which provides information concerning, for example, the aircraft's airspeed, Mach number, or flight direction, or a combination thereof, to the pilot. If the probe 10 is used on structures other than an aircraft, the transducer operates in other manners well known to those skilled in the art.

The air data probe 10 of the present invention further comprises means 42 for heating the probe 10 which are disposed in the wall 30 defined by the probe outer surface 28 and sampling chamber outer surface 26. The heating means 24 surround the chamber 24 and extend in the wall 30 from the base 12 of the probe 10 to the probe tip 18. Because the heaters 42 are disposed within the wall 30 of the probe 10, essentially all of the surface area of the heater 24 is in contact with the wall 30, and heat is conducted into the wall 30 very efficiently; using this invention, heat is conducted into the wall considerably more efficiently then in prior art constructions, where the heater only makes tangential contact with the wall of the probe. As a result, the present invention is significantly more effective in preventing the formation of ice on the probe 10, and for removing it if it forms at all. It is believed that use of the invention will enable heat to be transmitted up to at least about four times more efficiently than prior art probe. As will be described in more detail below, according to a preferred embodiment of this invention, the heater 42 is one or more resistive heating wire elements that extend in a spiral pattern in the wall 30 from the probe base 12 to the probe tip 18, and surrounds the sampling chamber 24. This is distinguished from the prior art, where the heater is disposed in the sampling chamber and is merely brazed to the wall of the chamber. Heretofore, it has not been known how to incorporate the heater into the wall, nor have the significant benefits in terms of heater efficiency that result from disposing the heater in the wall been known. The heater 42 is connected along a line 44 to suitable means well known to those skilled in the art for monitoring and/or controlling 46 the amount of electrical current that passes through the wire 42.

In the preferred embodiment of this invention the heater wire 42 comprises a central wire element surrounded by electrical insulation, which is in turn surrounded by a metallic sheath. Use of a metallic sheath assists in the formation of metallurgical bond between the sheath and the probe wall, which enhances the heat transfer capabilities of the heater.

Precise location of the heater wire 42 within the probe 10 is facilitated by one or more supports 54 which extend from the base 12 of the probe 10 to the tip 18 of the probe 10. The heater wires 42 are attached to the support 54 by brazing, welding, or mechanical means, and the heater 42 is incorporated into the probe 10 during a casting process described in more detail below. The support 54 is preferably a rod or strap, or other structure having a shape consistent with the overall shape of the probe. The size of the support 54 should be sufficient to provide structural strength to the wire 42 during the casting process. Each support 54 may extend continuously from the base 12 to the tip 18, or it may extend in discontinuous segments along the length of the probe 10. If the wire 42 is wound in a spiral fashion, the use of two supports 54 is preferred, both extending axially along the length of the probe 10 at diametrically opposite positions on the spiral (i.e., at 0° and 180° positions). However, it should be recognized that the number of supports used, and their shape and placement, is dependent on the degree to which the heater wire 42 requires support. Further, the supports may additionally improve the structural integrity of the probe itself, and may be incorporated into the probe for that purpose.

In an alternate embodiment of this invention, the support may be a tubular member having an inside diameter equal to or greater than the diameter of the sampling chamber 24, and essentially concentric with the axis 56 of the sampling chamber 24. In this embodiment, the heater wires are attached to the outer surface of the tubular member, in any pattern necessary to provide sufficient heating to the probe during use, and the tube provides structural support to the wires during the casting process.

As indicated above, the probe 10 of the present invention is best fabricated by a cast metal process. The heater wire 42 is arranged within a suitably dimensioned casting mold, and as molten metal is poured into the mold, the metal surrounds and encapsulates the wire, which significantly improves heat transfer characteristics between the heater wire 42 and the probe wall 30 as compared to the prior art. The casting process also provides a hermetic seal around the heater wire 42, thereby eliminating the possibility of corrosion and failure of the heater, which has occurred with the prior art heated probe constructions.

Preferably, the manufacturing process for fabricating the probe 10 of the present invention is carried out so that the heater wires 42 are located at either the mid-thickness point of the wall 30 or radially nearer the inner surface of the wall. The thickness of the wall 30 should be at least equal to the diameter of the wire 42, and preferably at least about three times the diameter of the wire 42, or more. Also, strength requirements should be taken into consideration in determining the thickness of the wall 30; as indicated above, the wire supports 54 may provide some degree of structural strength to the probe 10.

While a spiral pattern of the heater wire 42 around the sampling chamber 24 is preferred, other patterns fall within the scope of the present invention. As shown in FIG. 1, the probe has a leading edge 58 and a trailing edge 60; in most cases, the heater wire 42 extends slightly rearward of the leading edge 58 to slightly forward of the trailing edge 60 of the probe 10, and from the base 12 to the tip 18 of the probe 10. One or more positive temperature coefficient (PTC) resistive heaters or chips as described in U.S. Pat. No. 4,458,137 to Kirkpatrick may also be used in this invention, to supplement or enhance the performance of the wire heaters. Use of PTC heaters provides improved control over the amount of current that passes through the heater, and thereby, the amount of heat that is conducted into the probe body.

Figure 2:
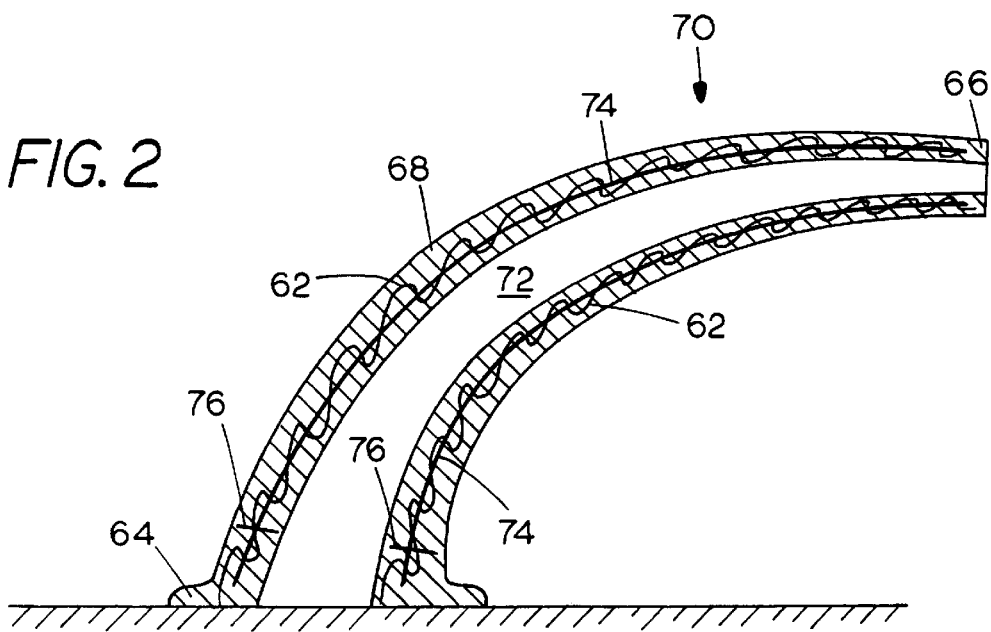
FIG. 2 is a cross-sectional view of an embodiment of the invention.

In addition to the spiral pattern described above, the heater wire may also be laced from the probe to the tip, as schematically shown in FIG. 2. In FIG. 2, the heater wire 62 extends from the base 64 to the tip 66, in the wall 68 of the probe 70. The laced pattern may be advantageous for heating the portion immediately adjacent to the base, or may be used in conjunction with a spiral pattern surrounding the sampling chamber 72. Alternatively, the laced pattern may be used on the barrel portion of a probe in addition to near the probe base. Axially and laterally extending supports 74 and 76, respectively, may be used in an appropriate combination to secure the heaters 62 within the probe 70. The particular arrangement of the wire 62 within the probe is not a critical aspect of the invention. Rather, the key aspect of the invention is locating the heater entirely within the wall of the probe body to benefit from the superior heat transfer benefits of the invention, and the enhanced corrosion-free life of the heaters.

Use of the present invention provides a significant advantage over the prior art arrangements of heaters, most notably in the heat transfer area and in the manufacture of products. For example, in prior art probes where the heater wires are brazed to the internal surface of the probe, a significant amount of heat is never transmitted to the probe itself because of the point contact arrangement of the wire and the probe surface. According to the present invention, locating the wires within the probe wall, and preferably radially near the sampling chamber surface, results in nearly total conduction of heat from the heater to the walls of the probe. As a result, the probe is deiced faster, and uses less energy than is required of prior art constructions. Also, corrosion of the heater wire is prevented because the wires are hermetically sealed within the wall of the probe. Because corrosion of prior art designs is a major cause of heater failures, use of the present invention is a substantial improvement over the prior art.

Referring again to FIG. 1, the air data transducers 34 that are used in the present invention may be either temperature transducers, pressure transducers, or combinations thereof. If the transducer 34 is a pressure transducer, then the opening 32 at the probe tip 18 is generally considered a pitot opening. Additional openings in the probe body may also be provided. For example, pitot-static openings located rearward of the pitot openings may be provided, in fluid communication via a suitably constructed and arranged conduit with a pitot-static pressure transducer. The pitot-static conduit may pass to the probe base, via a separate conduit, in the wall of the probe or it may pass to the base along the sampling chamber.

As is apparent from the foregoing discussion, the air data probe 10 of this invention is characterized by an air data sampling chamber 24 defined by walls 30 that extend from the base to the tip of the probe body 16, wherein the sampling chamber 24 communicates directly with a transducer 34 and heater means are incorporated in the probe walls 30. Alternatively, and as shown in FIG. 3, a fluid carrying conduit may pass through the chamber from the tip opening, directly to the transducer. As shown in FIG. 3, the probe 80 comprises a base 82, body 84, tip 86, and a chamber 88 extending through the body 84 from the base 82 to the tip 86. The probe 80 also includes a fluid carrying conduit 90 extending from the tip 86 to a transducer 92, through the chamber 88. Use of a separate conduit 90 within the chamber 88 for carrying fluid to the transducer 92 provides more accurate air data measurements. The conduit 90 may be fixedly attached to the walls 89 of the sampling chamber 88, or it may pass freely through the chamber 88, for example, in the form of a flexible tube having the capacity to withstand the operating temperatures and pressures of the probe 80. A freely extending conduit 90 is shown in FIG. 3, in which the probe 80 further includes a separate head 94 that may be attachable and detachable from the tip 86 of the probe 80. The head 94 is attached to the body by screws 96 or similar means which pass through a shoulder 95 on the head 94; the shoulder 95 mates with a flange 97 on the tip 86. The conduit 90 is in fluid communication with an opening 98 in the head 94 and extends through the chamber 88 of the probe 80 to the transducer 92. A terminating fitting 100 on the transducer 92, for receiving the end 104 of the conduit 90, is constructed to allow for easy attaching and detaching of the conduit 90. Exemplary fittings include barbed ends, as shown in FIG. 3, although other fittings known to those skilled in the art that function in a similar way to achieve the same result are useful. The probe 80 is attached to a structure 107, such as the surface 109 of an aircraft in an appropriate fashion. As in the examples above, heater means 110 extend in the wall 99 of the probe body 84, from the base 82 towards the tip 86.

A further aspect of the embodiment shown in FIG. 3 is that the head 94 includes heater means 108 that are separate from the heater 110 in the probe wall 99. As shown in FIG. 3, the head 94 preferably includes one or more wire heaters 108 that are brazed to the internal surface 112 of the head 4. Alternatively, the heaters 108 may also be cast into the wall 114 of the head 94; the head heaters operate independently of the heaters 110 in the wall 99 of the probe 80. The heaters 110 in the wall 99 are secured by suitable supports 111, as discussed above. In the embodiment shown in FIG. 3, the head 94 includes a tube 116 whose upstream end 118 defines the fluid opening 98 in communication with the conduit 90. The downstream end 124 of the tube 116 extends past the downstream end 126 of the head 94, and into the chamber 88 of the probe 80. The tube 116 has a barbed termination end 102, or similar such fitting, for readily attaching and detaching the conduit 90 that extends to the transducer 92. The termination ends 122 of the heater wires 108 in the head 94 are also suitably constructed to allow for easy connect/ disconnect capabilities, and preferably include means, such as conventional hermetic connectors, to keep the heater wires 108 free from moisture or other contamination that might otherwise degrade their operation or performance. The heater wires 108, 110 are both suitably connected to current controllers 128 and 130, respectively, in the manner and for the reasons discussed above.

While FIG. 3 shows the use of screws 96 to attach the head 94 to the tip 86, the head 94 may also be secured to the tip 86 by alternative means, e.g., brazing or welding; or it may be cast directly onto the head 94. The use of screws is preferred because is allows the user of the probe to easily replace the head, for example, in case it is damaged. Additionally, the head 94 may be fabricated from a material having a composition that is different that the composition of the body 84, to provide for enhanced properties at the head 94, e.g., corrosion and/or erosion resistance. In fact, a separate head, having the same composition as the probe body, or a different composition than the probe body, may be used in any of the embodiments of this invention.

A variation of the embodiments shown in FIGS. 1 and 3 is presented in FIG. 4, where a probe in accordance with the invention is shown as reference numeral 150. The probe 150 includes a base 152 for attachment (by means not shown) to a structure 154, and a tip 156. An opening 158 in the tip 156 leads to a sample chamber 160. The outer boundary 162 of the sample chamber 160 is defined by walls 164 of conduit 166. The conduit 166 extends from the opening 158 in the tip 156 of the probe 150 to, and preferably through, the base 152 of the probe 150. The conduit 166 is in fluid communication with a transducer 170 by means of connector 168 or other suitable fitting. The transducer 170 provides signals to a computer 172 or other similar signal input device.

In FIG. 4, heater wires 174 extend in the wall 176 of the probe 150 from the probe tip 156 to the probe base 152. The heater wire 174 is connected to a controller 178 which monitors and/or controls the amount of current passing through the wire. According to this embodiment, the wire 174 may either be attached to support straps that extend from the tip 156 to the base 152 as described above, or the wire 174 may be attached e.g., by brazing or mechanical devices to the outer surface 180 of the conduit 166. An even further support option, not shown in FIG. 4, is to incorporate an additional strap, conduit or tube in the wall 176 of the probe 150. The heater wire would be attached to such additional support by brazing or a similar attachment process.

As indicated above, additional conduits and openings could be provided in the various embodiments of this invention to provide, for example, a fluid carrying conduit for pitot static pressure measurement, temperature measurement, or angle of attack or sideslip measurement. In the case of the probe shown in FIG. 4, these additional openings would be provided downstream of the opening 158 in the tip 156. The passageways for such additional measurements would extend in the probe wall 176, and could either be defined by a chamber of the type shown in FIGS. 1 and 2, or a distinct conduit of the type shown in FIGS. 3 and 4. And, of course, additional heaters could be provided, in the form of wires, cartridge heaters, or PTC chips.

EXAMPLE 1

A strand of heater wire is wrapped around the outer surface of a mandrel or other suitable pattern having dimensions and shape suitably matched to the dimensions and shape of the probe to be manufactured. In particular, the external dimensions of the mandrel are slightly larger than the dimensions of the sampling chamber. The particular pattern that the wire is wound on the mandrel (e.g., the spacing between adjacent wire windings) is adapted to achieve the necessary heat transfer requirements. The heater wire is approximately 1.5 mm (0.06 in.) in diameter, and comprises a central resistance element which is surrounded by an insulating material; the insulating material is sheathed in a layer of metal, preferably nickel or other metal having a melting point no less than the melting point of the metal from which the probe is fabricated. After the wire is wound on the mandrel, and while the wire is still on the mandrel, supports are tack brazed along the leading and trailing edges of the winding, the supports extending essentially from the base to the tip. The wire (and its attached supports) is then removed from the mandrel, for example, by sliding the wire off the end of the mandrel. A fugitive pattern, preferably fabricated from any one of the known types of water soluble waxes used in the casting industry, is then fabricated. The wax pattern has external dimensions and a shape corresponding to the dimensions and shape of the sampling chamber of the probe to be manufactured; the external surface of the pattern corresponds to the external surface of the sampling chamber. Techniques for fabricating wax patterns are well known to those with ordinary skill in the art. The wire winding and its attached support structure is then placed onto the surface of the wax pattern (e.g., by sliding the wire onto the pattern, starting at the end of the pattern corresponding to the probe tip) and secured to the pattern by staples, pins, or other suitable attachment means. The wire is secured to the pattern such that the probe will have the desired distribution of wire within the probe wall at the completion of the casting process.

After the wire is secured to the pattern, a second fugitive pattern is made. Again, the preferred fugitive material is wax, preferably any of the known, non-water soluble wax compositions used in the casting industry. The external dimensions and shape of the second pattern corresponds to the external dimensions and shape of the air data probe being manufactured. The second pattern is formed around the first fugitive pattern such that the second pattern encapsulates the first. The thickness of the second pattern corresponds to the thickness of the probe body wall. Because the wire winding is arranged on the surface of the first pattern, during the formation of the second pattern, the second wax forms around the winding, and the winding becomes encapsulated by the second pattern wax.

Next, the first wax pattern is removed from within the second pattern. As indicated above, the first wax pattern is preferably water soluble, and the first pattern is removed simply by soaking the pattern assembly in water.

After the first pattern is removed, a cavity essentially having the shape of the sampling chamber is present in the second pattern. The cavity extends from the base of the pattern to the tip of the pattern. The heater wire is encapsulated in the second pattern. The next step in the process is to stucco the second wax pattern to form a shell mold, using any of the known ceramic slurry stucco processes suitable for casting metals such as beryllium copper, nickel, and aluminum (and their various alloys). The shell mold is then processed (e.g., heated) to remove the wax pattern from the mold. After the wax is removed, a hollow mold exists, with the heater wire and its attached supports extending between the walls of the mold from the base of the mold to the tip. The staples that had previously attached the heater wire to the wax pattern are now attached to the stucco material, and provide additional support to the wire heater. Next, molten metal is poured into the mold and allowed to solidify. As indicated above, the composition of the metal is selected to achieve high thermal conductivity. Alloys of aluminum, copper, and nickel are suitable, as are certain metal matrix composites. After the metal has solidified, the shell is removed by conventional means, and an air data probe having a sampling chamber within the probe body, a uniform composition cast microstructure extending from the tip to the base, and means for heating the probe extending from the tip to the base in the wall of the probe is produced. Suitable connections are made to a transducer and current controls, and a probe is ready for operation.

EXAMPLE 2

A heater wire is wound into a spiral pattern, and supports are attached to the wire, as described in Example 1. The wire is removed from the mandrel and rather than being attached to a wax pattern as set forth in Example 1, the wire is suitably secured to a ceramic core or other suitable heat resistant casting core. The core has external dimensions and a shape corresponding to the dimensions and shape of the sampling chamber of the probe to be manufactured. The wire winding is secured to the core so that the desired distribution of wire heater will be present in the probe wall at the completion of the casting process.

After the wire winding is secured to the core, the wire and core assembly is encapsulated in a fugitive pattern, for example, a wax pattern. The thickness of the wax pattern corresponds to the thickness of the probe wall. A stucco coating is then applied to the wire, core and wax assembly, with the core suitably positioned within the stucco mold by means of core pins or other conventional devices. After the stucco application step, the wax pattern is removed, using conventional process steps, thereby forming a hollow casting mold. Metal is cast into the mold, and after it solidifies, the shell and core are removed from the casting. A probe characterized by heater wire within the walls formed by a uniform composition, cast metal microstructure results.

EXAMPLE 3

A heater wire is wound into the desired pattern directly onto a wax pattern, and supports are attached to the wire, as described in Examples 1 and 2. The wire is attached (e.g., by staples) to the pattern, also as described in Examples 1. Contrary to these prior Examples, however, the pattern in this Example 3 includes a metal conduit tube which passes through the pattern, preferably along its longitudinal axis. The tube extends out of the pattern, past both the tip end of the pattern and the base end of the pattern. Next, a second wax pattern is formed around the first, wire wound wax pattern, such that the second pattern encapsulates the first. As in Example 1, both wax patterns are fabricated using techniques well known to those skilled in the art; the external dimensions and shape of the second pattern corresponds to the external dimensions and shape of the air data probe being manufactured, and the thickness or lateral dimensions of the second pattern corresponds to the thickness or lateral dimensions of the probe body wall. The wax of the second pattern forms around the wire winding on the first pattern, and as a result, the winding is encapsulated by the second pattern wax.

The first wax pattern is removed from the second pattern, and the second pattern is then coated with a stucco or other ceramic material suitable for metal casting. The ends of the conduit are sealed to prevent ceramic material from getting into the conduit during the stucco process; however, the ceramic material is intentionally applied to the end portions of the conduit to fix the conduit in space when the second wax pattern is removed in a subsequent step. After the ceramic material is applied, the second wax pattern is removed by conventional techniques forming a hollow ceramic shell mold having a metal conduit and wire winding therewithin. Molten metal is then poured into the hollow space defined by the ceramic shell. After the metal solidifies, the shell is removed, and a solid metal air data probe is produced, the probe having a sampling chamber defined by a metal tube and heater wires in the wall of the probe body; each extending from the tip to the base, and the probe body further characterized by a uniform composition cast metal microstructure extending from the tip to the base of the probe.

EXAMPLE 4

This Example is similar to Example 3, with the exception that the first pattern is a ceramic pattern (or core). A metal conduit, which will form the fluid passageway to the transducer, passes through the ceramic pattern, and the wire winding is then attached to the core. The ceramic core is encapsulated with wax or other suitable fugitive pattern; a heat resistant shell mold material is applied to the wax pattern; the wax pattern is removed, forming a shell mold with a ceramic core and metal tube therewithin; molten metal is poured into the shell mold; and the ceramic shell and ceramic core are removed. A solid metal air data probe having a sampling chamber defined by a metal tube, a hollowed portion having a shape of the ceramic core, and heater wire(s) extending from the tip to the base in the wall of the probe is formed.

EXAMPLE 5

A heater wire is wound into the desired pattern and attached to a fugitive pattern such as wax. Supports are attached to the wire, either prior to or subsequent to placing the wire on the pattern. In this Example, a conduit preferably of a heat resistant metal tube passes through the pattern, and extends past the ends of the pattern. The pattern is them coated with stucco or other material suitable for forming a casting shell. (The ends of the conduit are sealed to prevent stucco material from contaminating the inside of the conduit during the stucco application process.) After the stucco process is completed, the fugitive pattern is removed, thereby forming a hollow shell within which extends the conduit; the tube is secured within the shell by the stucco, which was applied near the ends of the tube, as in Example 4. The heater wires and their supports are adjacent to, but not encapsulated in, the shell. (In order to insure that the wires are not encapsulated in the shell, it may be preferable to apply a thin layer of a fugitive material, such as wax, over the wires and the fugitive pattern prior to the stucco process.) Next, molten metal is then poured into the shell; it solidifies and produces a solid metal air data probe heaving a metal conduit passing therethrough, and heater wires within the probe walls. The probe is entirely solid (except for the tube) and has no other passageways or hollow areas.

Although this invention has been shown and described with respect to detailed embodiments thereof, it should be understood by those skilled in the art that various changes in form and detail thereof may be made without departing from the spirit and scope of the invention. For example, it is apparent that the wire heater may be wound in any of a number of various orientations to form a de-icing and anti-icing configuration for the probe. The wire may be wound on a mandrel and transferred to a fugitive pattern, or it may be wound directly on the pattern. Further, the probe may include a detachable head, with its own, independently controlled heaters; the head may be fabricated from a material that differs from the material of the probe body, or it may be the same material. Additional ports for sampling additional air data parameters may be provided in the probe: for example, pitot static ports may be provided in addition to a pitot port, or temperature ports may be provided. Such variations as these, and others, may be made and will still be within the scope of this invention.

We claim:

1. An air data probe having an outer surface and comprising a base for attachment to a structure, a tip for extending into an air stream, and a body extending from the base to the tip and having a sampling chamber therewithin that extends from the base to the tip, wherein the outer boundary of the sampling chamber is defined by a chamber outer surface, and the chamber outer surface and the body outer surface define a wall therebetween having a uniform composition cast metal microstructure, wherein means for heating the probe are disposed in the wall and extend from the base to the tip.

2. The air data probe of claim 1, wherein the tip includes a passageway extending therein, and the probe further comprises a conduit disposed within the sampling chamber in fluid communication with the passageway in the tip and with an air data transducer spaced from the base.

3. The air data probe of claim 1, wherein the heating means is a heater wire disposed in the wall.

4. The air data probe of claim 2, wherein the air data transducer is selected from the group of transducers for measuring temperature and pressure.

5. The air data probe of claim 2, wherein the tip passageway is constructed and arranged for measuring pitot pressure.

6. The air data probe of claim 2, further comprising a second passageway downstream of the tip passageway, the second passageway extending through the probe wall to a second conduit within the sampling chamber, wherein the second conduit is in fluid communication with the second passageway and with a second air data transducer spaced from the base.

7. The air data probe of claim 6, wherein the second passageway is constructed and arranged for measuring pitot-static pressure.

8. The air data probe of claim 3, wherein the heater wire surrounds the sampling chamber and extends in a spiral pattern from the probe base to the probe tip.

9. The air data probe of claim 3, wherein the heater wire is adjacent to the sampling chamber and extends in an axially laced pattern from the probe base to the probe tip.

10. The air data probe of claim 8, wherein the heater wire is supported within the probe wall by a support structure that extends from the probe base to the probe tip.

11. The air data probe of claim 9, wherein the heater wire is supported within the probe wall by a support structure that extends from the probe base to the probe tip.

12. The air data probe of claim 10, wherein the heater wire is fixedly attached to the support structure.

13. The air data probe of claim 2, wherein the conduit is fixedly attached to the outer surface of the sampling chamber.

14. The air data probe of claim 2, wherein the conduit passes freely through the sampling chamber.

15. A heated air data probe for attachment to an air vehicle, the probe having an outer surface and comprising a base for attachment to the air vehicle, a tip extending into an air stream, and a body extending from the base to the tip, wherein the tip includes a pitot port and the body includes a pitot chamber that extends in the probe body and provides for fluid communication between the port and a pitot pressure transducer, wherein the outer boundary of the pitot chamber is defined by a chamber outer surface, and the chamber outer surface and the probe outer surface define a solid wall therebetween, and wherein the probe includes means for heating the probe body that extend in the probe wall from the probe tip to the probe base.

16. The air data probe of claim 15, further comprising a pitot-static port downstream of the pitot port, wherein the pitot-static port extends to a pitot-static chamber in the body that provides for fluid communication between the pitot-static port and a pitotstatic pressure transducer.

17. The air data probe of claim 15, wherein the heater means comprise a heater wire electrically coupled to means for controlling the amount of current that passes through the wire.

18. The air data probe of claim 17, wherein the heater wire surrounds the pitot chamber and extends in a spiral pattern from the probe tip to the current controlling means.

19. A heated air data probe for attachment to an air vehicle, comprised of a base for attachment to the vehicle, a tip extending into an air stream, a body having an outer surface and extending from the base to the tip, and a head attached to the tip for sampling the air stream, wherein the head includes an air sampling passageway in communication with a fluid carrying conduit that extends from the tip to an air data transducer, wherein the probe body includes a chamber through which the conduit passes, and the surface of the chamber and the surface of the body define a wall therebetween, and wherein the probe includes a first heater for heating the probe body, the heater extending in the wall of the probe from the base to the tip, and a second heater for heating the head.

* * * * *